United States Patent [19]
Lloyd

[11] 3,957,398
[45] May 18, 1976

[54] WAVE ENERGIZED PUMP
[76] Inventor: Harold Lloyd, 67 Casselman Place, Chula Vista, Calif. 92010
[22] Filed: Sept. 3, 1974
[21] Appl. No.: 502,283

[52] U.S. Cl. ................................. 417/331; 60/497; 60/503; 60/505; 60/506
[51] Int. Cl.² ..................... F04B 17/00; F04B 35/00
[58] Field of Search .................... 417/331, 332, 333; 60/497, 499, 502, 503, 505, 506

[56] References Cited
UNITED STATES PATENTS

| 855,258 | 5/1907 | Neal | 417/332 |
|---|---|---|---|
| 879,992 | 2/1908 | Wilson | 417/331 |
| 1,589,403 | 6/1926 | Krause | 417/333 |
| 2,028,056 | 1/1936 | Franklin | 417/333 |

FOREIGN PATENTS OR APPLICATIONS

| 918,326 | 10/1946 | France | 417/331 |

Primary Examiner—Carlton R. Croyle
Assistant Examiner—Richard E. Gluck
Attorney, Agent, or Firm—Ralph S. Branscomb

[57] ABSTRACT
This is a floating pumping station, conceived as ordinarily to be used at the shore of the ocean or large lake where wave action is very considerable and where provision must be made for tidal change and in some cases change in the force of the waves since the waves of great amplitude must be refused entry into the apparatus or attenuated. The apparatus comprises, in brief, a pair of elongated pontoons which define a channel therebetween and this channel is guarded at one end at least by the said wave attenuating apparatus, while a plurality of double-acting pumps distributed along the length of the channel operate in response to the movement of floats which are connected to the pistons of the pump. The pumps have their inlets connected to a common filter sump wherein the water level is substantially that of the surrounding sea or lake, and a unique feature of the invention comprises a compartmentation of each pontoon, the compartments being distributed along the length of each pontoon and connected by a common conduit with stub pipes leading into each compartment and valved in such manner that float actuated water level controls in each compartment assure that the pontoons remain stabilized with respect to the water level in the filter sump which is the water level of the surrounding sea or lake.

4 Claims, 6 Drawing Figures

WAVE ENERGIZED PUMP

BACKGROUND OF THE INVENTION

A great many wave action motors and pumps have been proposed and some have been developed and put in practice. However, it appears at the present writing that very few, if any, of such machines have been universally acclaimed as successful. While the force of waves is obviously very material, there are at least three great difficulties in harnessing these forces, namely, the rise and fall of the tide in any body of water large enough to have significant waves, the irregularity in the amplitude of the waves, and the irregularity in the direction of the waves. The answer to the first problem is of course not at all insurmountable since any floating pumping station will respond to the tides and it is understood that there is no great novelty in the broad concept of making such a wave action machine or pump on a floating platform. It is believed however that little attention has been allocated to the problem of control of the waves as such and to preventing a change of direction of waves from making the device inoperable and the present invention seeks to overcome these problems.

SUMMARY OF THE INVENTION

The present invention seeks to overcome the problems above enunciated by providing a floating pumping apparatus of a considerable length, ordinarily on the order of about 600 feet long, and defining its own wave channel between two elongated pontoons with a plurality of pumps distributed along the channel each pump being operated by a float which moves up and down in response to wave action within the channel, the pumps being all connected together in such a manner that a somewhat uniform output is obtained even though the wave action is not identical at different parts of the channel. The pontoons are each cavitated or compartmented with a carefully controlled amount of ballast water in each compartment to lend stability to the entire assembly, the compartments as well as the pumps being fed from a common sump wherein the level of the water is that of the surrounding sea or lake. An adjustable baffle at at least one end of the above mentioned channel controls the entry of the waves into the channel in such a manner that the amplitude of the admitted waves, while not uniform, will be more or less controlled within limits of operability of the pumping apparatus. Double acting pumps are employed and the throw of the pump pistons can be adjusted as to the direction in which the pistons operate. Ordinarily this direction of throw is nearly vertical but the above mentioned variations make it possible to improve the efficiency of the pumps.

DETAILED DESCRIPTION OF THE PREFERRED EMBODIMENT OF THE INVENTION

Figure 1:
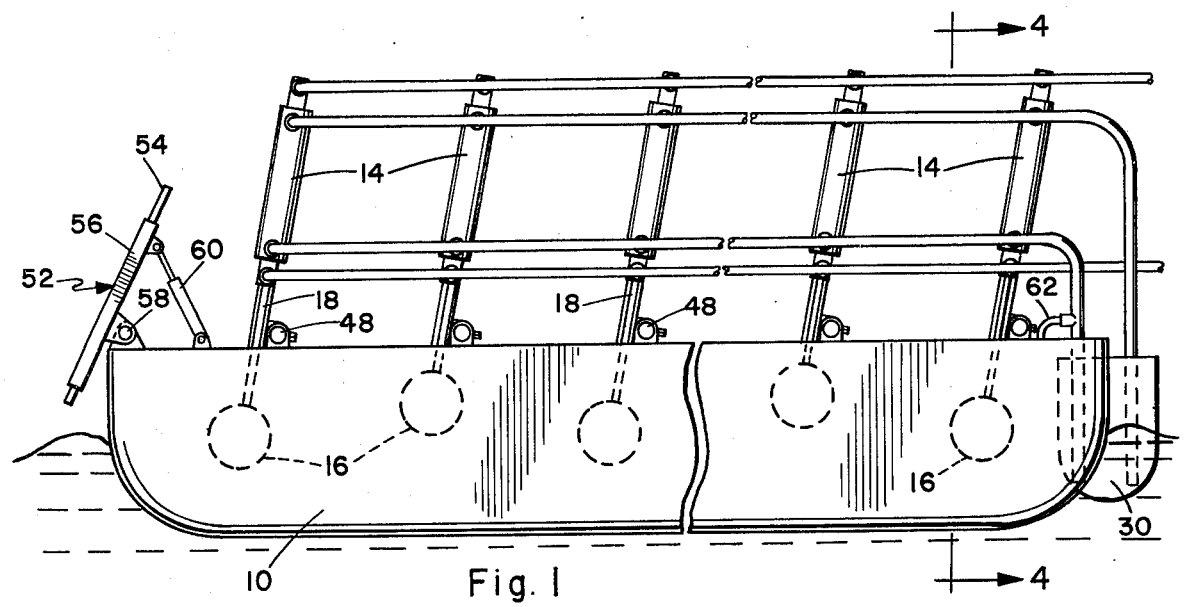
FIG. 1 is a side elevation view of the complete pumping apparatus, it being understood that the utilization means to be connected with these pumping apparatus is not illustrated since it is not an essential element of the present invention.
Figure 2:
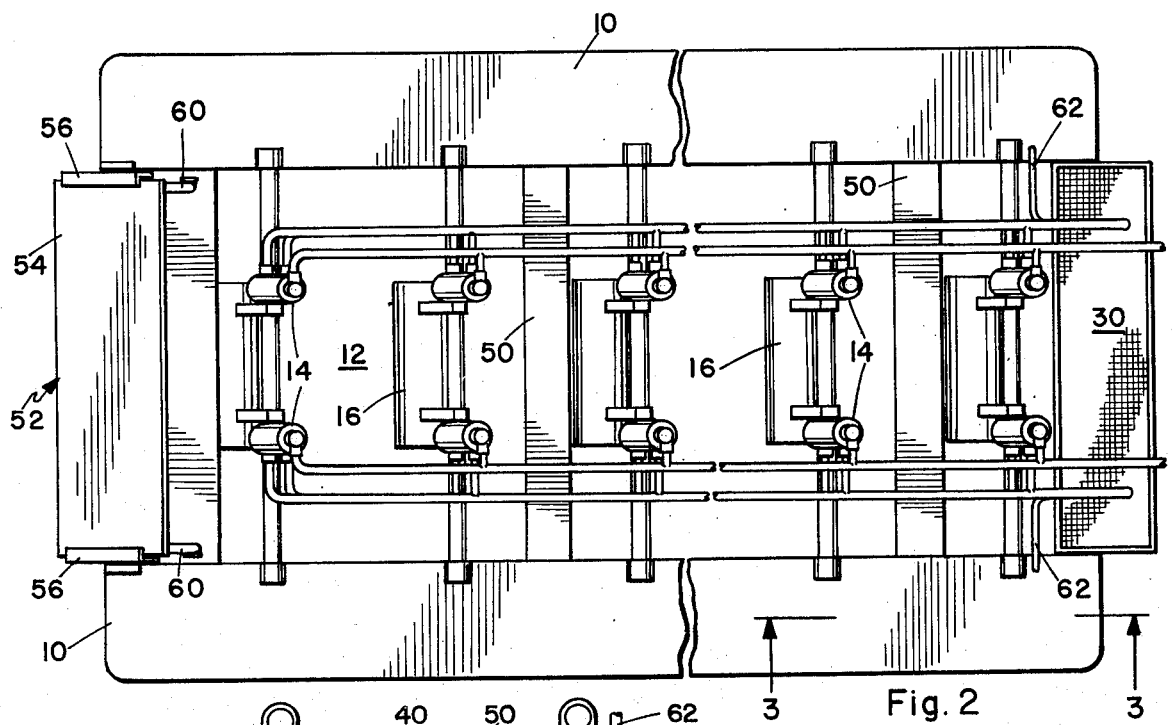
FIG. 2 is a top plan view of the apparatus showing of FIG. 1.
Figure 4:
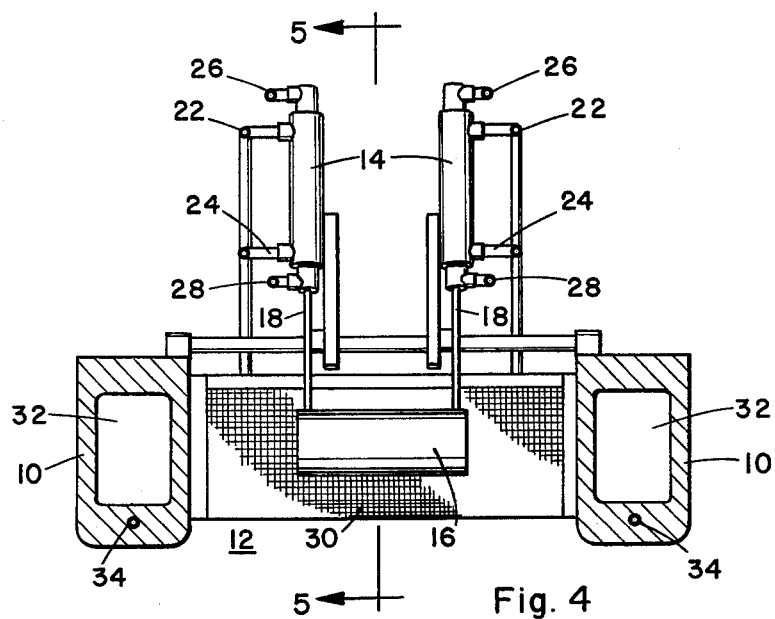
FIG. 4 is a sectional view taken on line 4—4 of FIG. 1.
Figure 6:
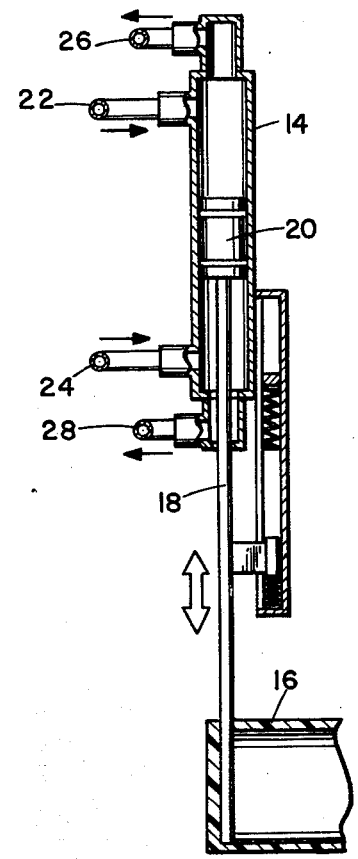
FIG. 6 is a sectional view, somewhat diagrammatic in character, taken on line of 6—6 of FIG. 5.

Referring to the drawings, wherein reference characters will be used to indicate the same or similar elements of the invention, the wave-energized water pumping apparatus will be recognized as primarily comprising a pair of similar elongated pontoons 10 and these pontoons are proposed as being on the order of 600 feet long. The pontoons 10 define therebetween a elongated channel 12 which will ordinarily be recti linear. Spaced along this channel and mounted upon the pontoons are a plurality of pumps generally indicated by the numeral 14 and these pumps are preferably arranged in pairs as is clearly illustrated in FIGS. 1, 2, and 4. Each pair of pumps has a single wave operated float 16, a rigid piston rod 18 and piston 20 as best illustrated in FIG. 6, whereby each pump 14 is made double-acting and each pump has an inlet 22 at the top and another inlet 24 at the bottom, as well as an outlet 26 at the top and an outlet 28 at the bottom. The outlets are connected to a utilization device, not illustrated, which will ordinarily be a resevior or the like on an elevated neighboring shoreline from which it can be utilized to operate a generator or a water driven motor. Thus water can be pumped continuously and the stored potential energy used as needed.

Figure 5:
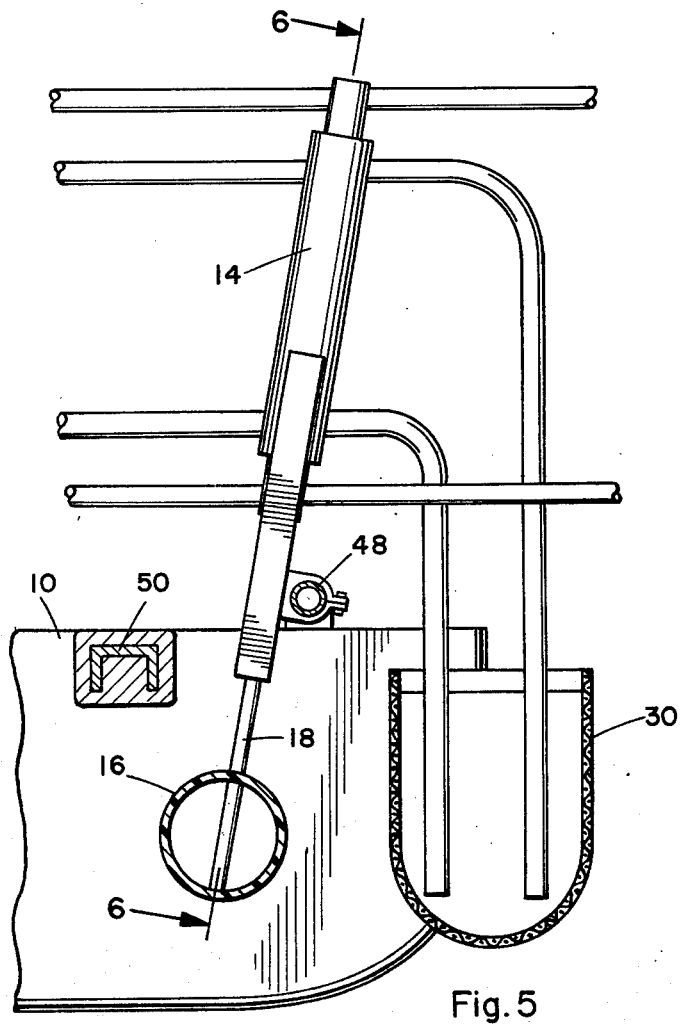
FIG. 5 is an enlarged sectional view taken on line 5—5 of FIG. 4.

The inlets 24 and 22 are both connected with a filter sump 30 which is conceived as being located ordinarily at one end of the pumping apparatus, as best illustrated in FIG. 5, the filtering action being necessary to exclude seaweed, debris, fish, and anything which would clog the pumps, and the level of the water in the sump 30 will be noted as being necessarily the level of the water in the sea or lake wherein the device is installed.

Figure 3:
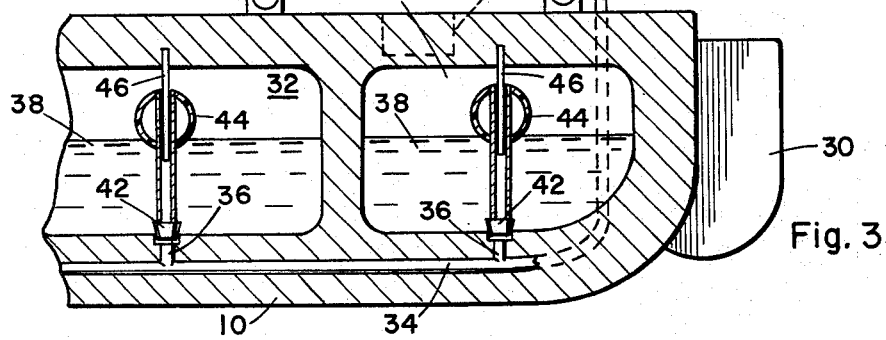
FIG. 3 is an enlarged sectional view, fragmentary in character, and showing the structure as taken from the line 3—3 of FIG. 2.

It is very important that the pontoons be stabilized and to this end each pontoon is cavitated or provided with compartments 32. A common conduit 34 with stub pipes 36 serves to connect the compartments in one single system, it being proposed that each compartment will be partially filled with water as indicated at 38 FIG. 3 with a large trapped air bubble 40 above the water 38 in each compartment to lend the required floatation characteristics to the pontoons while the water 38 will provide adequate ballast therefor. To maintain the water level uniform so that the entire assembly will remain stable each stub pipe has associated therewith a valve means, somewhat diagrammatically indicated at 42, this valve being opened in response to the lifting of the float 44 which is itself guided by a guide pin 46 fixed in the upper wall of the compartment, all as clearly indicated in FIG. 3. When the level of the water 38 in the compartment concerned rises above the level of the water in the sump 30, a certain amount of water will be drawn from this particular compartment because the valve 42 will be opened by the float 44 so that any seepage of water into the compartment will not be allowed to accumulate to the extent of upsetting the stability of the pumping apparatus.

A unique feature of the invention will be recognized in the adjustability of the pumps to different angles of throw, the pumps being adjustably mounted as indicated at 48 so that the throw, ordinarily nearly vertical, can be adjusted within certain limits to accomodate for different wave action encountered in different environments and different conditions wherein the invention is to be used. As illustrated, all the pumps will be shifted together and the inlet pipes and outlet pipes will be made to accomodate for such adjustment, as somewhat diagrammactically indicated at FIG. 1.

As mentioned above, the channel 12 between the pontoons will ordinarily be linear and uniform in cross section, the pontoons being rigidly secured together by any suitable means such as the cross beams 50. As illustrated, at one of this channel 12 there is provided a wave control means to regulate or at least limit the effective amplitude of the waves as they enter the channel. This wave control means comprises a baffle 54 which is slidably mounted in a slide 56 and the slide is pivoted to the pontoons as indicated at 58 and the tilt of the slide is adjusted by hydraulic cylinders 60, all as clearly indicated in FIG. 1. In storm conditions or when the waves are regarded as being too high the slide and the baffle carried thereby will be tilted in such a manner that the bottom edge at least of the baffle will interfere with the entry of the waves into the channel 12, controlling their amplitude in such a manner that the floats 16 will be capable of operating in their design function. It should be noted that this adjustibility of the baffle 54 can be made in conjunction with adjustment of the pumps 14, as indicated diagrammatically at 48 to achieve maximum efficiency in the operation of the device.

Operation of the invention will be clearly understood from the consideration of the foregoing description of the mechanical detail thereof, taken in connection with the abstract and the claims. Further description would appear unnecessary. Minor variation in such details as the arrangement of the conduit 34, which is also at 62 in FIG. 1, the particular nature of the pontoons per se, the particular double-acting pumps used, and even the particular configuration of the wave control means 52 are all matters subject to minor variations to meet the environmental needs and such variation is commonplated as covered by the appended claims.

I claim:

1. A wave energized water pumping apparatus comprising:
   a. a float having horizontally elongated pontoons defining a wave channel therebetween, said pontoons being compartmented and partially filled with water as ballast;
   b. a super structure connecting said pontoons and spanning said channel;
   c. pumps mounted on said super structure and having wave-action-responsive actuators in said channel;
   d. said pumps having inlets in said channel and outlets for connection to a utilization means;
   e. each of said pontoons having a conduit with stub pipes interconnecting the different compartments thereof;
   f. float operated valve means controlling flow through each stub pipe;
   g. said conduits being also connected with the inlets of said pumps, so that an excess of water in any compartment opens corresponding valve means in that compartment to maintain the water in the compartments at a common level.

2. Structure according to claim 1 wherein each of said pumps includes a piston rod and said wave-action responsive actuators comprise bouyant floats directly mounted on the ends of said piston rods.

3. Apparatus according to claim 2 and including wave control means to limit the freedom of entry of waves into said channel, said wave control means comprising a baffle adjustable vertically and angularly at the mouth of said channel.

4. Apparatus according to claim 1 and including a common filter sump for said pump inlets and said conduit, said sump being disposed so that to water level therein is substantially that of the body of water wherein the pumping apparatus is used.

* * * * *